(12) United States Patent
Prater (10) Patent No.: US 11,107,592 B2
(45) Date of Patent: Aug. 31, 2021

(54) PLASMA CONFINEMENT DEVICE WITH HELICAL CURRENT AND FLUID FLOW

(71) Applicant: Daniel Prater, Noblesville, IN (US)

(72) Inventor: Daniel Prater, Noblesville, IN (US)

( * ) Notice: Subject to any disclaimer, the term of this patent is extended or adjusted under 35 U.S.C. 154(b) by 0 days.

(21) Appl. No.: 16/748,797

(22) Filed: Jan. 21, 2020

(65) Prior Publication Data

US 2020/0234832 A1 Jul. 23, 2020

Related U.S. Application Data

(60) Provisional application No. 62/795,003, filed on Jan. 21, 2019.

(51) Int. Cl.
  *G21B 1/05* (2006.01)
  *G21B 1/11* (2006.01)
  *H05H 1/10* (2006.01)

(52) U.S. Cl.
  CPC ............... *G21B 1/05* (2013.01); *G21B 1/11* (2013.01); *H05H 1/10* (2013.01)

(58) Field of Classification Search
  None
  See application file for complete search history.

(56) References Cited

U.S. PATENT DOCUMENTS

| | | | | |
|---|---|---|---|---|
| 4,713,208 A * | 12/1987 | Furth | ....................... | H05H 1/12 376/137 |
| 5,147,596 A * | 9/1992 | Weil | ....................... | G21B 1/052 376/134 |
| 8,680,488 B2 * | 3/2014 | McMorran | ............... | H01J 37/28 250/492.2 |
| 9,754,686 B2 * | 9/2017 | Jarboe | ....................... | G21B 1/11 |
| 2001/0046273 A1 * | 11/2001 | Koloc | ....................... | H05H 1/04 376/121 |
| 2011/0142185 A1 * | 6/2011 | Woodruff | ................. | G21B 1/05 376/121 |
| 2015/0187443 A1 * | 7/2015 | Tuszewski | ............. | G21B 1/052 376/101 |
| 2016/0079548 A1 * | 3/2016 | Kita | ....................... | H05B 33/20 252/519.21 |

* cited by examiner

*Primary Examiner* — Crystal L Hammond (74) *Attorney, Agent, or Firm* — Bruce J. Bowman (57) ABSTRACT

A device and method for generating plasma conditions for deuterium-tritium and advanced fuel thermonuclear fusion consisting of an inner helicity-containing plasma such as a spheromak compact toroid bounded by a plurality of outer cusped magnetic fields. Helicity driven by steady-inductive helicity injectors energizes the plasmoid with helicity. The device further includes means for driving fluid rotation about the device axis, about the device magnetic axis, and means for a hot electron sheath. Means are also provided for reducing particle losses out through the open cusp field lines through helicity injector rectification.

18 Claims, 8 Drawing Sheets

PLASMA CONFINEMENT DEVICE WITH HELICAL CURRENT AND FLUID FLOW

CROSS-REFERENCE TO RELATED APPLICATIONS

This U.S. non-provisional patent application claims the benefit of and/or priority under 35 U.S.C. § 119(e) to U.S. provisional patent application Ser. No. 62/795,003 filed Jan. 21, 2019 titled "Plasma Confinement Device," the entire contents of which is specifically incorporated herein by reference.

FIELD OF THE INVENTION

The present invention relates in general to the subjects of ionized gas (plasma) devices, and devices and methods for plasma heating and specifically, to devices and methods for plasma heating and current drive in magnetic confinement devices possessing cusp-shaped magnetic fields.

BACKGROUND OF THE INVENTION

Confining and heating plasma for thermonuclear fusion and other uses requires plasma pressure to exceed a threshold measured typically in terms of plasma temperature and density for some minimum of plasma energy confinement time [1].

A primary reason why thermonuclear fusion energy is not yet in wide-spread use is the presence of plasma magnetohydrodynamic instabilities. Ideal MHD-stable confinement geometries do exist and they are open cusped-field confinement configurations subject to plasma losses. Cusps have a number of beneficial attributes including low magnetic field requirements, natural diverters for the removal of ash and impurities, and steady-state operation [2], [3].

Excessive free-streaming plasma losses out through the open cusp regions has limited cusped-field reactors from attaining adequate temperatures and pressures for thermonuclear fusion [4]. It has been suggested [3] that one possible means of limiting losses from cusped-field reactors is to introduce a magnetic field to the normally field-free plasma. Plasma "locks-in" to magnetic field lines and when closed within the reactor plasma is locked into the reactor. This is one basis for the good confinement qualities of the tokamak reactor.

Here we provide means for introducing closed internal magnetic fields to plasmas confined by open magnetic field lines, namely cusps but also mirrors, by injecting helical current, or helicity, into the normally field-free plasma present in cusped-field reactors thereby limiting free-streaming losses. One such helical-current plasma is the spheromak plasmoid [5]. Spheromaks, like cusped-field plasma configurations, have better MHD stability than the leading tokamak plasmas and generally are suitable for steady-state operation.

The addition of helicity into the normally field-free volume of cusped-field reactors permits additional heating means by electron cyclotron resonance heating (ECRH).

In addition to providing means for introducing internal currents and fields for improving open field-line configuration reactors through helicity injection, an object of the present invention is to provide a means for generating poloidal fluid flow in the plasma through the use of cusped toroidal fields as is presently done with cusped poloidal fields (see U.S. Pat. No. 9,462,669 and [6]-[8]). Fluid flow establishes a steep density gradient with reduced radial particle transport resulting in the L-mode to H-mode conversion seen in Tokamaks [9]. In Tokamak reactors poloidal flow is likely due to internal pressures. Driven, flow can accomplish these improvements in transport barrier function with the additional benefit of control of flow speed, however, no means of this have yet been available. Here we provide these means. By combining poloidal fluid flow with toroidal fluid flow means are established for generating helical fluid flow. By combining helical fluid flow with helical current drive (helicity injection) new physics may result.

SUMMARY OF THE INVENTION

A device and method for creating plasma conditions [1] sufficient for deuterium-tritium and advanced, fuel thermonuclear fusion consists of an inner helicity-containing plasma such as a spheromak compact toroid plasmoid bounded by a plurality of outer cusped magnetic fields. Helicity driven by helicity injectors energizes the plasmoid with helical current. The device further includes means for driving fluid rotation about the device axis, means for driving fluid rotation about the magnetic axis, and means for a hot electron sheath. Driving fluid rotation about both the magnetic and geometric axes is helical fluid flow. Means are also provided for reducing particle losses out through the open cusp field lines through helicity injector rectification.

Further aspects of the present invention will become apparent from consideration of the drawings and the following description of the invention. A person skilled in the art will realize that other forms of the invention are possible and that the details of the invention can be modified in a number of respects without departing from the inventive concept. The following drawings and description are to be regarded as illustrative in nature and not restrictive.

BRIEF DESCRIPTION OF THE DRAWINGS

The features, characteristics, structures, elements and/or the like of the invention will become more apparent and the invention itself will be better understood by reference to the following detailed description of a form of the invention taken in conjunction with the accompanying drawings.

Not shown are elements well known to those skilled in the art including electrodes for inducing azimuthal fluid flow across poloidal cusped fields (see U.S. Pat. No. 9,462,669 and [11, 21, 23]), windows (or antenna, or horns) for microwave injection (see [10]), or alternate means for placing steady-inductive helicity injectors at other poloidal angles (see [11]), all of these references of which are specifically incorporated herein by reference.

DETAILED DESCRIPTION OF THE INVENTION

The present invention will now be described to provide an overall understanding of the principles of the structure, function, manufacture, and use of the devices and methods disclosed herein. Those skilled in the art will understand that the devices and methods specifically described herein and illustrated in, the accompanying drawings are non-limiting forms and that the scope of the present invention is defined solely by the claims. The features illustrated and/or described in connection with a form may be combined with the features of other forms. Such modifications and variations are intended to be included within the scope of the present invention, but not limiting thereof.

FIGS. 1-3, 5, and 7-8 show a multiple magnetic cusp plasma confinement system, device or reactor 50 having closed internal plasma toroidal and poloidal fields 101 arising from helicity injection, for example by, steady-inductive helicity injection (SIHI) via SIHI injectors 104 with the openings of the helicity injectors 105 directed toward emptying into the reaction volume 70. The system 50 uses internal fields for particle confinement rather than relying on a sharp cusp sheath and high-beta operation which has proven difficult to realize in practice [4]. Due to the closed field lines we further disclose using a hot electron sheath driven to temperature by microwave energy to increase ion energy confinement time.

Cusps are high-$\beta$ ($\beta \approx 1$, where $\beta$ is the ratio of plasma pressure to magnetic field pressure), minimum-B (where B is magnetic field), plasma confinement systems adaptable to many different geometries [2]. Generating a spheromak within a multiple ring-cusp has a number of possible benefits [3]:

First, the power gain ratio, of cusped-field reactors can be improved by closed magnetic fields such as in the tokamak and spheromak 101. Closed field lines help to confine alpha particle energy, facilitating ignition, and having the resultant magnetic shear stabilizes any lower hybrid drift instabilities in the plasma edge; and Second, cusps act as natural diverters permitting helium ash and impurity removal, and particle access for direct energy conversion [12], to provide increased operating efficiency and cost savings. Since alpha particles are poorly confined, helium ash accumulation would be slower than in a tokamak. The same goes for sputtered wall atoms that penetrate into the plasma core. These are normally well confined, diluting the fuel density and cooling the plasma by radiation losses, and must be removed. Since both cusps and spheromaks are both sought for operation in steady-state either the axial ends or the helicity injectors themselves [13] can be used to flow in fresh fuel and permit for a weak pressure gradient to move ash and impurities to the natural cusp diverters.

Typically, cusps have particle and energy loss characteristics that greatly diminish confinement. Conventional cusp particle losses should be improved by helicity injection and the closed internal plasma field lines resulting from helicity injection. If enough helicity can be injected and the lifetime of the plasma long enough an internal plasmoid 101 may form within the normal field-free cusp reactor volume.

The plasmoid generated and sustained by helicity injection into the cusped-field reactor volume may be of any type such as field-reversed configuration and spheromak compact toroids. The spheromak plasmoid is preferred for its dynamo behavior quality, internal toroidal confinement fields, and steady-state drive means through SIHI. Taylor relaxation to the fully-relaxed spheromak state is not seen as necessary at this time for device operation but it is expected that reconnection will produce closed toroidal and poloidal fields within the plasma reactor volume 70.

The number and architecture created by the arrangement of the plurality of cusped field coils and the fields they generate in practice may be more or less than shown in the figures to specify the overall reaction volume architecture, or to decrease the magnitude of the external confinement field ripple, or specify some other feature. Cusped fields have a high field gradient near the plasma and between one another and the design of the field coils is expected to be determined by device specifications.

The reaction volume 70 architecture may vary. In one embodiment the reaction volume is cylindrical centered on the device geometric axis like the Jupiter reactor [3] and the Plasma Couette Experiment (PCX) [7]. Neither of these prior art reactors had helicity. In a Jupiter- or PCX-like configuration helicity is injected into the reactor volume and fluid flow is driven at the plasma edge by electrodes as in PCX [7]. In another embodiment the reaction volume is spherical centered on the device geometric axis like the Big Red Ball plasma device [8]. These three are examples of reaction volume architectures that are additionally topologically spherical or simply-connected. Other reaction volume architectures may still be topologically spherical while enveloping the plasmoid magnetic axis 100 leading to a somewhat toroidal reaction volume architecture as illustrated in the FIGs. 1-3 and in [11], [14]. Because of the natural diverter openings in the walls at the cusps the central column of the reactor may not have to be segmented to eliminate poloidal current flow [15]. This feature might be accomplished by the outer wall being segmented at the cusp diverters and by suitable insulating material in the central column gap 90. The reaction volume architecture with a continuous, insulating central column is therefore somewhat like a torus. The requirement that no poloidal current flows along the wall may be accomplished whether with a simply-connected topology with a gap in the central column 90 or may be accomplished with a toroidal reaction volume architecture with poloidal gaps at some poloidal angle such as at the cusps and a suitable insulating dielectric in place of the central column gap 90. Reaction volume architecture is likely to be specified based on reactor requirements.

Plasmoid aspect ratio is one specification of the reaction volume architecture. In one form, a fusion-fission hybrid reactor may specify a conventional cylindrical prolate volume with ring cusps along a cylindrical axis like the Jupiter reactors [3] for increased plasma-wall interactions. In another form a high aspect ratio device may be specified for obtaining high plasma fluid rotation speed. In another form a high aspect ratio device specifying fewer ring cusps for specific loss cone characteristics. In another form an oblate bow-tie volume of low aspect ratio may be specified for thermonuclear fusion. Aspect ratio is typically decided on the basis of various requirements such as tilt and rotational stability [13], [15] and overall reaction volume. In one embodiment the plasmoid aspect ratio is ~sixteen (16) [16]. An example of a multiple ring-cusped plasma reactor with two (2) cusps and a toroidal reactor volume is the Tormac bi-cusp [17], [18]. The Tarmac suffered startup issues by having no internal closed flux surfaces in practice [4]. These may be introduced and maintained by helicity injection which imparts linked toroidal and poloidal flux through driving plasma internal toroidal and poloidal currents.

Plasmoid currents and internal fields are driven by steady-inductive helicity injection (SIHI) using steady-inductive helicity injectors [13] for imposed-dynamo current drive [19]. Steady-inductive helicity injection heats the plasmoid as does any other means of heating the plasmoid well known to those skilled in the art, for example, ion cyclotron resonance heating (ICRH), electron cyclotron resonance heating (ECRH), neutral beam injection (NBI), and etc.

In one embodiment, the SIHI injectors are mounted to, produce a spheromak plasmoid in the vessel volume. The SIHI injectors are mounted to open at any poloidal hour. In one form, mounting is along the horizontal midline as in [11] this case being at the 9:00 (left) and 3:00 (right) positions when viewing a total poloidal cross-section of the reactor having left and right poloidal cross-sections on either side of the geometric axis. In another form, mounting produces openings at the 12-o'clock position [20] to empty axially downward into the reactor and in another form, injectors mount to open nearest the reactor geometric axis or at the 3:00 (left) and 9:00 (right) positions when viewing a total poloidal cross-section of the reactor. Any number of helicity injectors 104 may open 105 into the reaction volume 70.

Helicity is expected to be lost out through the cusps. One means of minimizing this helicity loss may be by rectifying the SIHI. SIHI works by oscillating opposing flux, and voltage coils [13], [19]. Normally SIHI works without rectification. In a cusped-field device, with open field lines extending out away from the reaction volume, cusped fields nearest a helicity injector will align with the flux arising from the flux coil every half-period. This alignment could connect the magnetic flux surface arising from the helicity injector with the cusped field potentially placing particles into the velocity space of the loss cone for the cusped field. This loss mechanism can be remedied by half-wave or full-wave or some amount of rectification of the helicity injector flux or voltage or both such that the flux generated by the flux coil alignment with the field leading to a cusp is reduced.

The cusped fields exist in part to replace the image currents in typical spheromak flux conservers that stabilize tilting and balance the hoop force [5]. Spheromaks are characterized by toroidal m to poloidal n flux ratio safety factor q 1 at the magnetic axis decreasing outward due to increasing poloidal flux. Tokamaks have q 1 near the magnetic axis increasing outward due to the strong toroidal field generated by the toroidal field coils. Avoiding plasma destabilizing rational fractions of m and n integers is more readily accomplished when m rather than n is the fundamental. For this we may set the spheromak toroidal field to the desired value at the magnetic axis, say 1 Tesla, and, design the helicity injector system to produce the required helicity to account for cusp losses.

A discontinuous force-free separatrix region is expected to form interior to the cusps with field direction opposed to the internal spheromak. Magnetic pressure exerted on the spheromak by toroidal image currents in the flux conserver is thereby replaced by the multiple ring-cusp field pressure, half being accountable for helicity loss due to field alignment, half exerting some non-zero pressure, with an equilibrium established when the system is balanced.

Open cusp regions are an available route for helicity transfer, and indeed, cusped fields have been proposed for flow-driven helicity injection into multiple ring-cusp-confined plasmas through by another means [6].

Helicity conservation requires no poloidal current, at the wall and therefore no toroidal field at the wall. No poloidal current at the wall of a spheromak flux conserver is satisfied after Taylor relaxation and therefore a working system has driven helicity. Driving helicity will exhaust power from the system through the cusps and must be accounted for. In analogy to the tokamak, a scrape-off layer forms revealing natural diverters at the cusps. The amount of this scrape-off layer for spheromak systems has been estimated to be <10% of the plasma radius [13].

Field coils 102 are used to balance the hoop force arising from an internal current similarly as to the S-1 spheromak experiment [15]. The radial hoop force is a consequence of the Lorentz force of the poloidal plasma current density being greater on the inboard side of the spheromak near the geometric axis than the outboard side and at equilibrium this must be balanced by an external poloidal field. Flux conserver currents in the non-driven case are generated by a spatial discontinuity in toroidal magnetic field going to zero at the wall as the spheromak relaxes and this current generates the poloidal field necessary to null the poloidal field at the axis [15]. In driven spheromak systems [11] the hoop force needs to be balanced by external currents to null the poloidal field at the axis. The spheromak thus lies within an external field that is 180-degrees opposed to the field generated by the current within the spheromak making the spheromak want to flip over and align. The hoop force-balanced spheromak thereby is subject to tilting upon perturbation whereby it inverts orientation to the lower energy state of aligned polarity with the external field whereby helicity and confinement are lost. In the flux conserver scheme stability against tilting is provided by flux conserver shape and transient image currents opposing tilt perturbations [14].

Tilt instability can be controlled by properly shaping the plasma reaction volume [14]. Cusp fields can sum to balance the radial hoop force and in addition edge-directed plasma fluid rotation may help balance tilt.

Edge-directed toroidal plasma fluid flow is described in U.S. Pat. No. 9,462,669 and [6]-[8]. In one form flow speed is sufficient to have an effect on balancing the tilt instability and in another embodiment is sufficient to ionize neutrals. Flow speeds exceeding 200 km/s were demonstrated in the Maryland Centrifugal Experiment [21].

An alternating electrode and cusp field configuration generates the azimuthal flow regimes in the Big Red Ball device at University of Wisconsin-Madison [8]. The Big Red Ball multiple ring-cusp is spherical but any shape is available for the spheromak to expand into and occupy including the ideal shapes for tilt stability [14].

In one embodiment of the present invention the central column gap 90 is closed with a suitable insulator to assist in preventing poloidal current flow. In this case toroidal field coils 202 may be added to the system. In one embodiment they carry conventional current being aligned and, in another embodiment, the current of each adjacent toroidal field coil is opposed to create toroidal field cusps (see FIG. 5). With cusped toroidal fields the option is created to induce poloidal fluid flow using an arrangement of electrodes analogous to those for inducing azimuthal fluid flow (see Prater U.S. Pat. No. 9,462,669 and [6]-[8]. Herein azimuthal fluid flow is also referred to as toroidal fluid flow. The transport barrier that is established by fluid flow [9] is thereby extended to both the toroidal and poloidal directions with suitable addition of poloidal cusp field coils 103 (not shown in FIG. 5). Example reactor embodiments thereby may have helicity, toroidal fluid flow, poloidal fluid flow, or any combination thereof. A suitable, combination of toroidal and poloidal fluid flows drives helical fluid flow.

One can imagine various scenarios for helical fluid flow reactors given the appropriate combination of toroidal and poloidal cusped fields. In one embodiment a tokamak-like device such as the one shown in FIG. 5 has adjacent toroidal field coil currents alternating in polarity to create toroidal cusped fields, and poloidal cusped fields, and electrodes disposed for generating poloidal and toroidal flows respectively. In such a way helical flow can be driven in a tokamak-like cusp reactor with or without the aid of the central solenoid.

A second embodiment example of helical fluid flow is a stellarator-like cusped-field device. In this case adjacent helical field coils of a stellarator-like device, possessing some degree of both poloidal and toroidal components [22], carry currents in opposing directions so as to induce cusps between each helical field coil. An electrode inserted to intersect the plasma at the cusped fields as in FIG. 5 and in prior art references will induce fluid flow perpendicular to the confinement field. In the case of the cusped-field stellarator device with helical fields such action will produce helical fluid flow.

Figure 1:
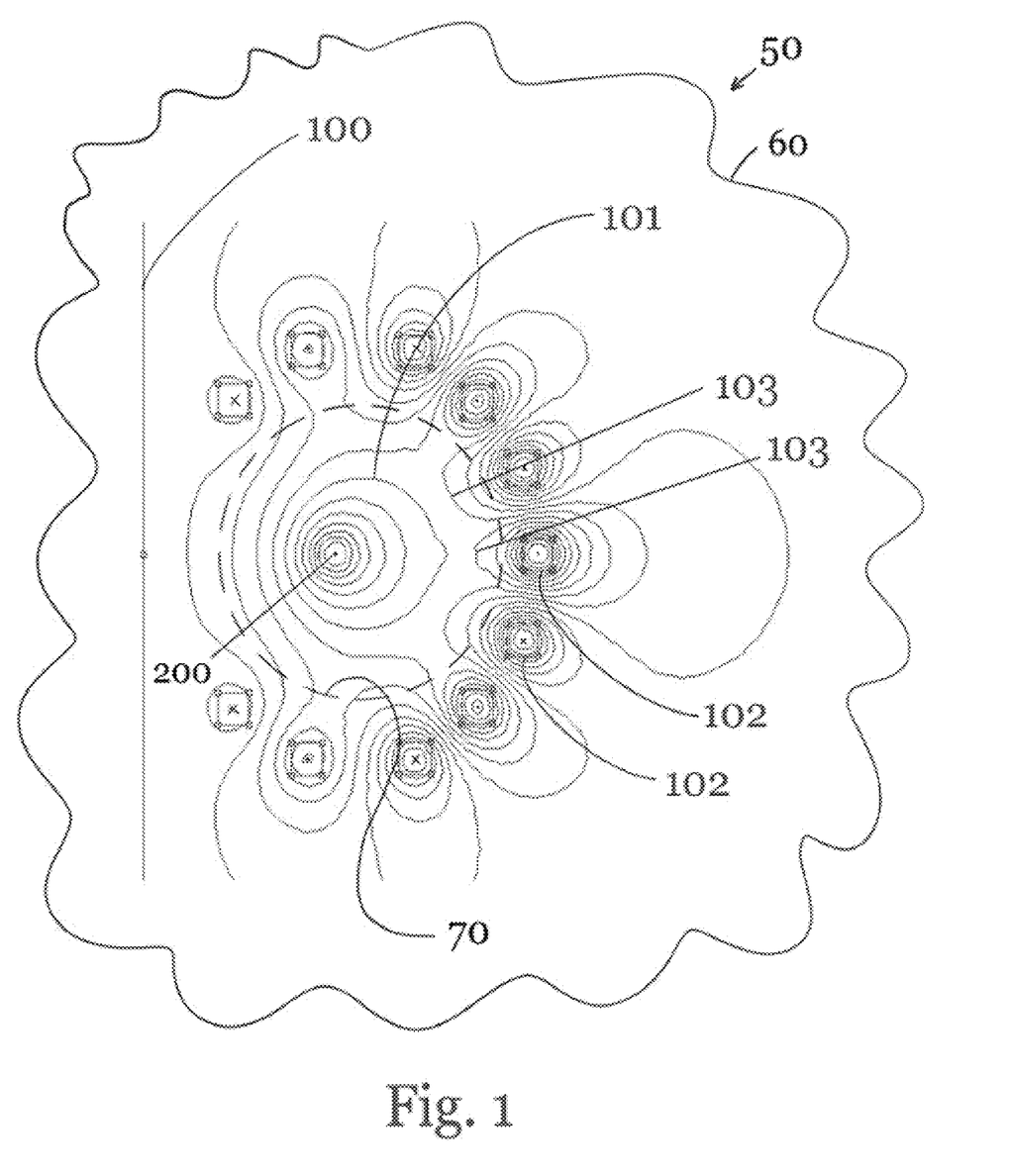
FIG. 1 is a poloidal cross-section view of the present device 50 having a geometric axis of rotational symmetry 100, with a plasmoid 101 having helicity, for example a spheromak, confined in a reaction volume 70 of a plasma chamber 60. Reaction volume 70 is a hypothetical surface, in FIG. 1 shown with a circular cross-section, created by poloidal cusp magnetic field coils 102 generating poloidal cusped magnetic fields 103, of which two (2) are indicated following field line convention. Here two (2) of eleven (11) poloidal cusp magnetic field coils 102 are indicated of any possible number. Also shown within each poloidal cusp magnetic field coil are 'X' or '⊙' to indicate the opposing directions of currents for generating cusped magnetic fields and '⊙' to indicate magnetic axis 200.
Figure 2:
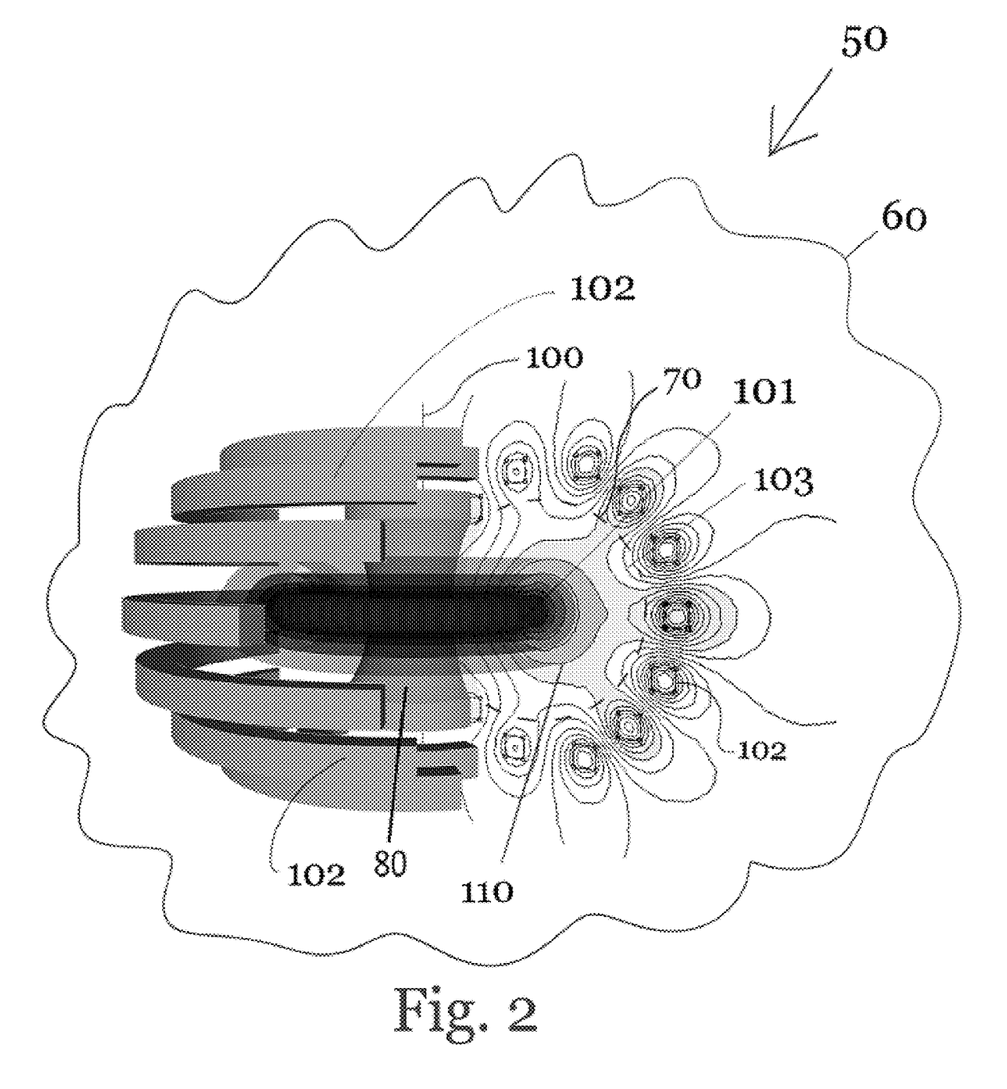
FIG. 2 is a perspective view showing the relative positions of the plasmoid 101 and magnetic field coils 102 of one embodiment of the device 50 with a boundary 110 separating the helicity-containing internal plasmoid 101 and the poloidal cusped fields 103. This boundary will separate the internal plasmoid 101 with poloidal cusped fields or toroidal cusped fields. The hypothetical reaction volume 70 in one form is thermodynamically open.
Figure 3:
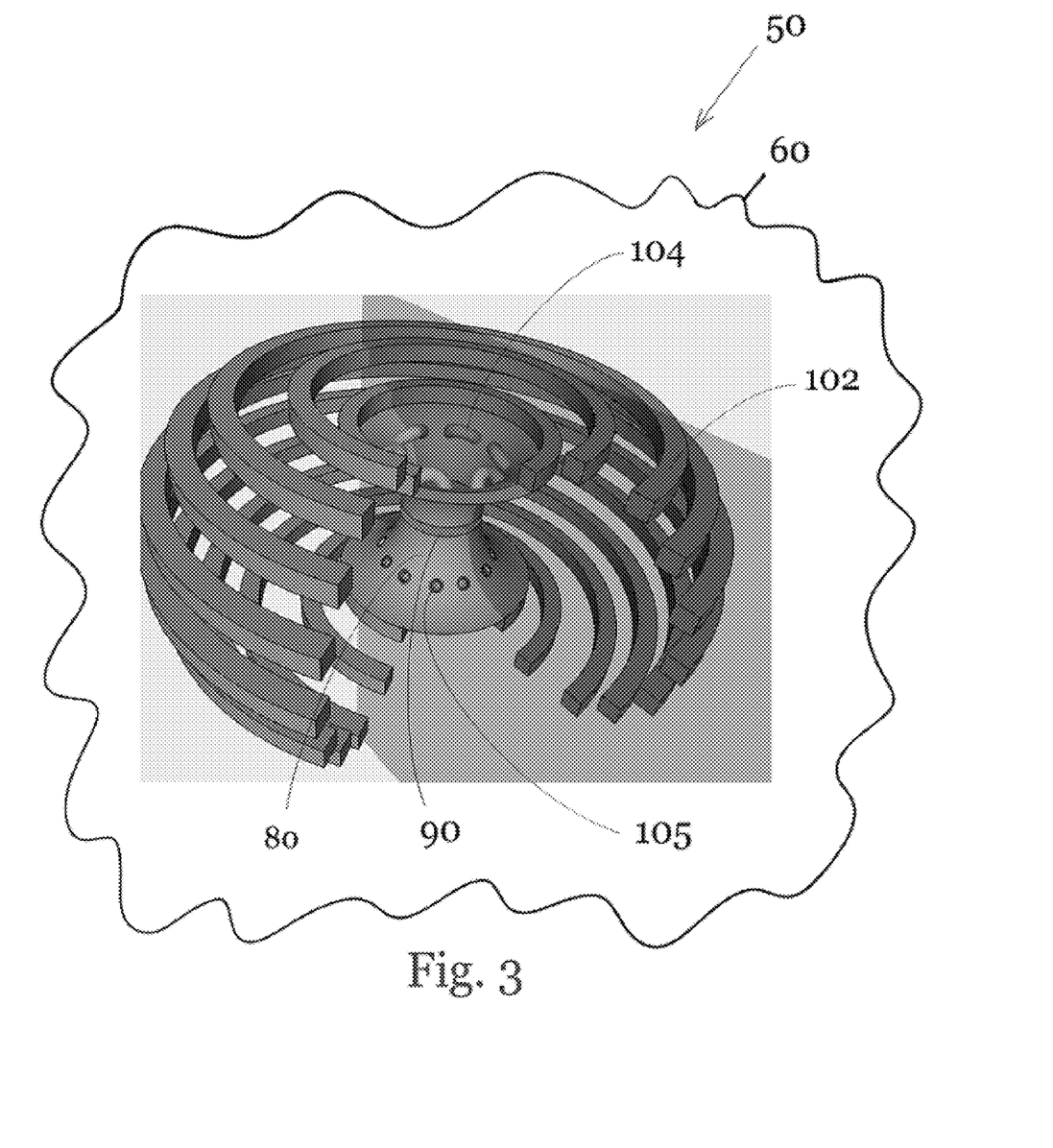
FIG. 3 is a perspective view showing one embodiment for positioning of the field coils 102 and helicity injectors 104 with the openings of the helicity injectors 105 directed toward emptying into the reaction volume 70. Also shown are central column 80 and gap 90 in the central column to cancel poloidal wall image currents.
Figure 4:
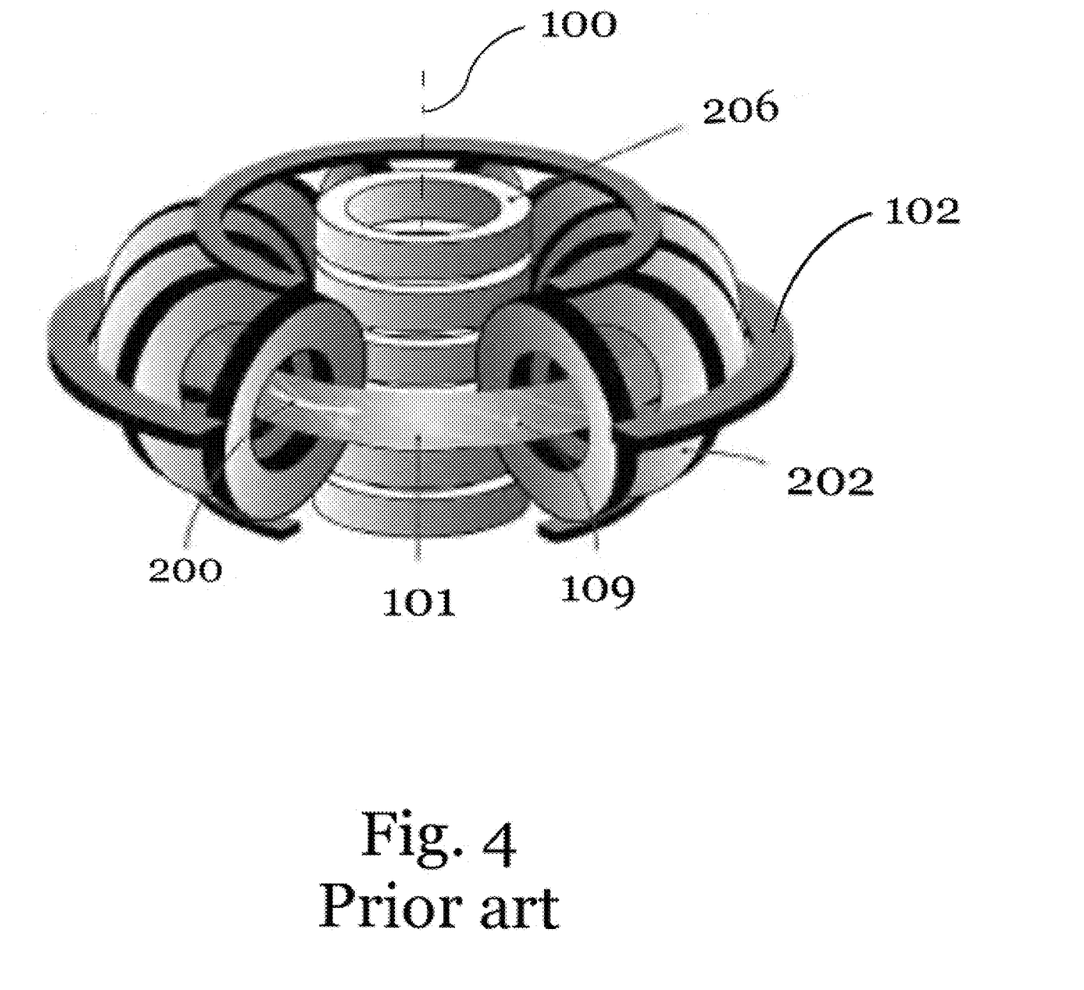
FIG. 4 is a perspective view showing, elements of a typical prior art tokamak reactor showing device axis 100, approximate magnetic axis 200, plasma comprising helicity or plasmoid 101, poloidal field coils 102, toroidal field coils 202, central solenoid 206, and the resulting helical field 109 when the poloidal field coils have aligned currents and the toroidal field coils have aligned currents. When the currents are aligned a helical topology 109 is assumed to form in the plasma. Not shown are the vacuum vessel and other associated hardware pieces typical of working reactors, which are well known to a person skilled in the art.
Figure 5:
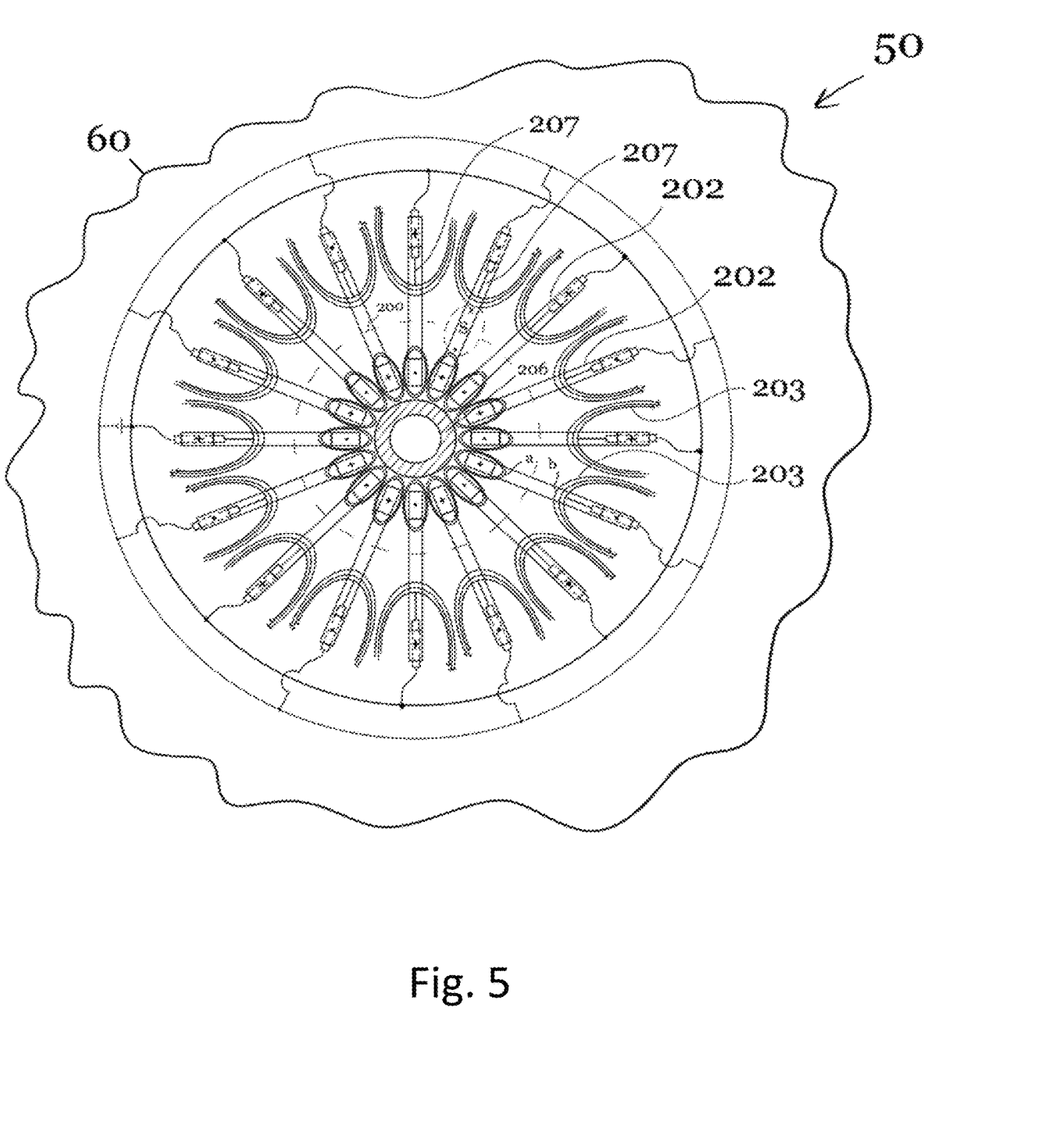
FIG. 5 is a top view of a midline transverse section through the magnetic axis at approximately field coil 102 indicated in FIG. 4 (not shown) showing sixteen (16) toroidal field coils 202, two (2) of which are indicated, each having currents opposed to the adjacent toroidal field coil as indicated by 'X' and '⊙'. These opposed toroidal field coil currents generate toroidal cusped fields 203, two (2) of which are indicated, each having an inboard portion a and an outboard portion b. The central solenoid typical of prior art tokamak reactors is indicated by 206. Electrodes 207, alternating in polarity with respect to their relative positions intersecting toroidal cusp field lines and plasma (not, shown) induces poloidal fluid flow S into or out of the page as indicated. Here the arbitrary selection of electrode and field coil polarities induces the plasma to rotate about the magnetic axis 200, indicated by a dashed circle, into the page on the outboard side and out of the page on the inboard side. In this one embodiment the electrodes are, positioned on the outboard side of the plasma but any poloidal position for the electrodes is possible, for example, on the inboard side, or at the axial poles. By reference to U.S. Pat. No. 9,462,669 and [11, 21, 23] one can see that the axial or geometric axis of prior art for generating azimuthal fluid flow is here connected into a torus to induce poloidal fluid flow. Combining the prior art azimuthal fluid flow with poloidal fluid flow generates helical fluid flow.
Figure 6:
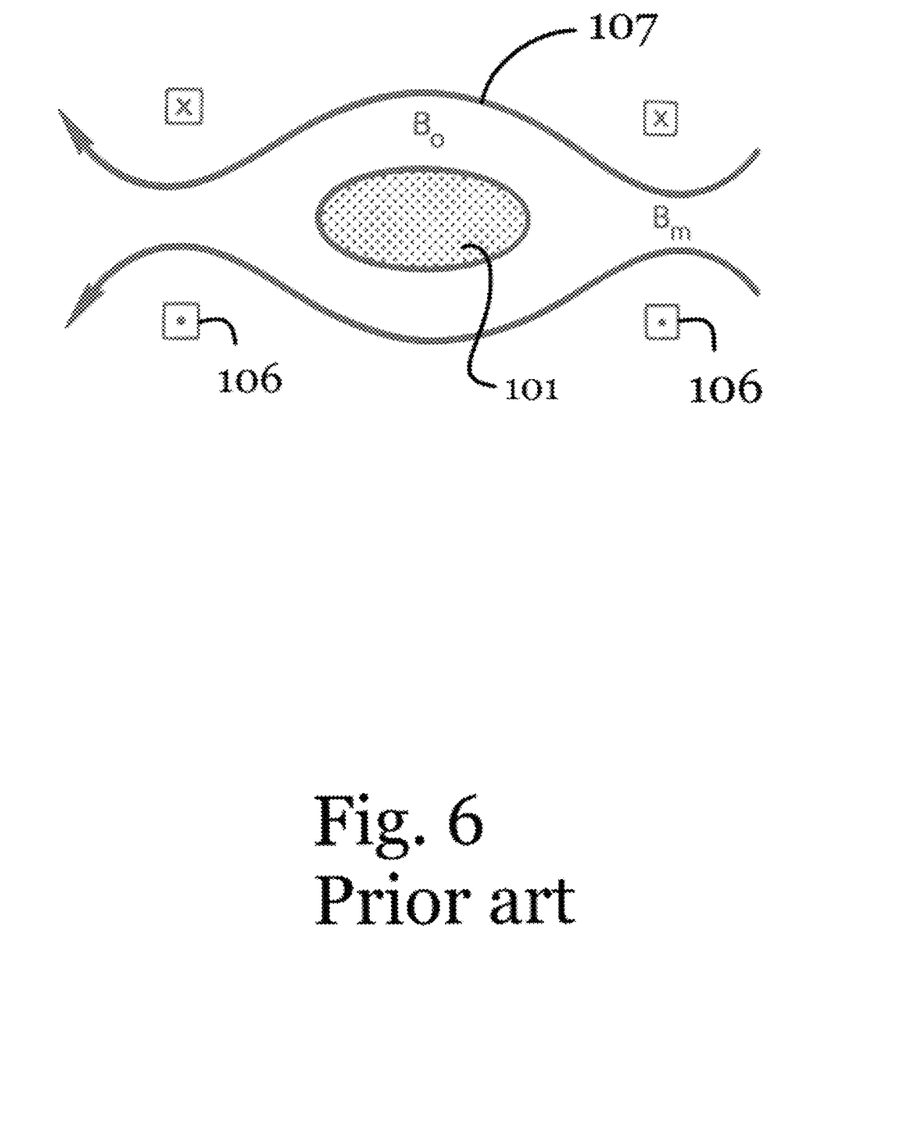
FIG. 6 is a side cutaway view of a simple magnetic mirror device showing plasma 101, in this case not comprising helicity, magnetic mirror coils 107 producing magnetic mirror field 107.
Figure 7:
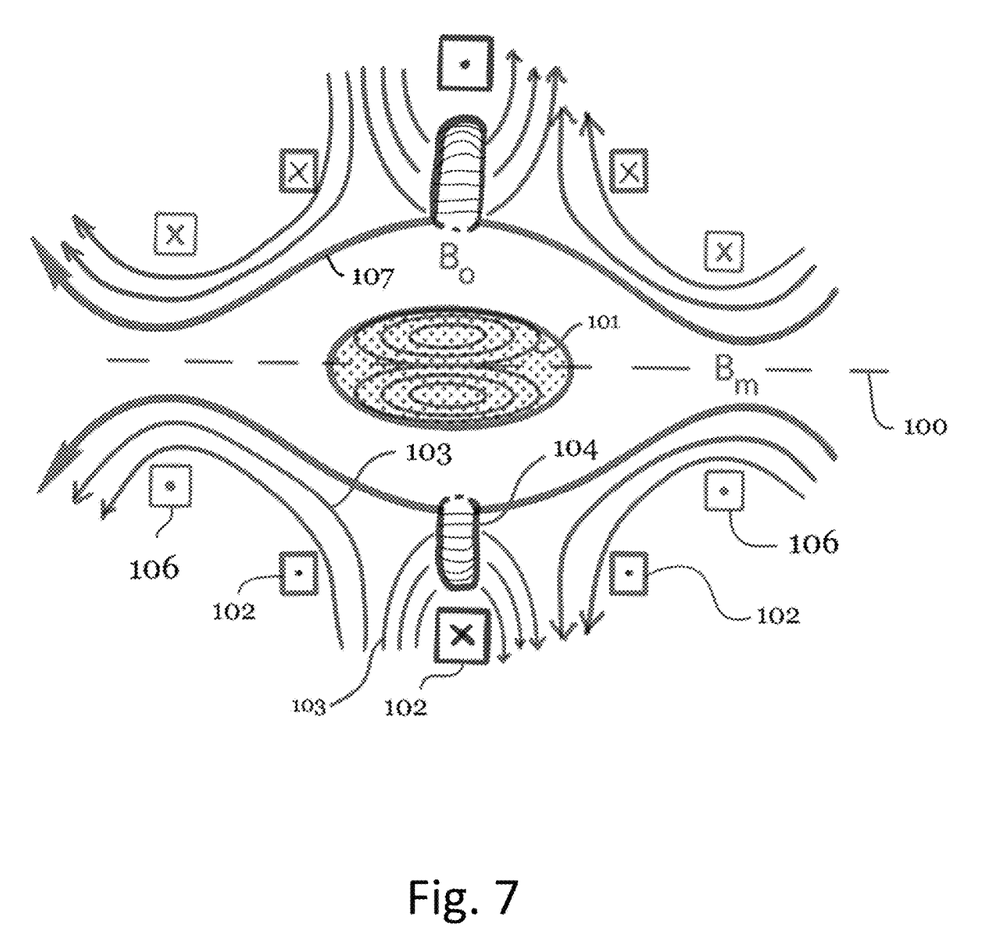
FIG. 7 is a similar side view as FIG. 6 of a simple magnetic mirror device having helicity injectors 104. Also shown is the device geometric axis 100, plasma comprising helicity or plasmoid 101, poloidal cusp field coils 102, cusped magnetic fields 103, magnetic mirror coils 106, and magnetic mirror field 107.
Figure 8:
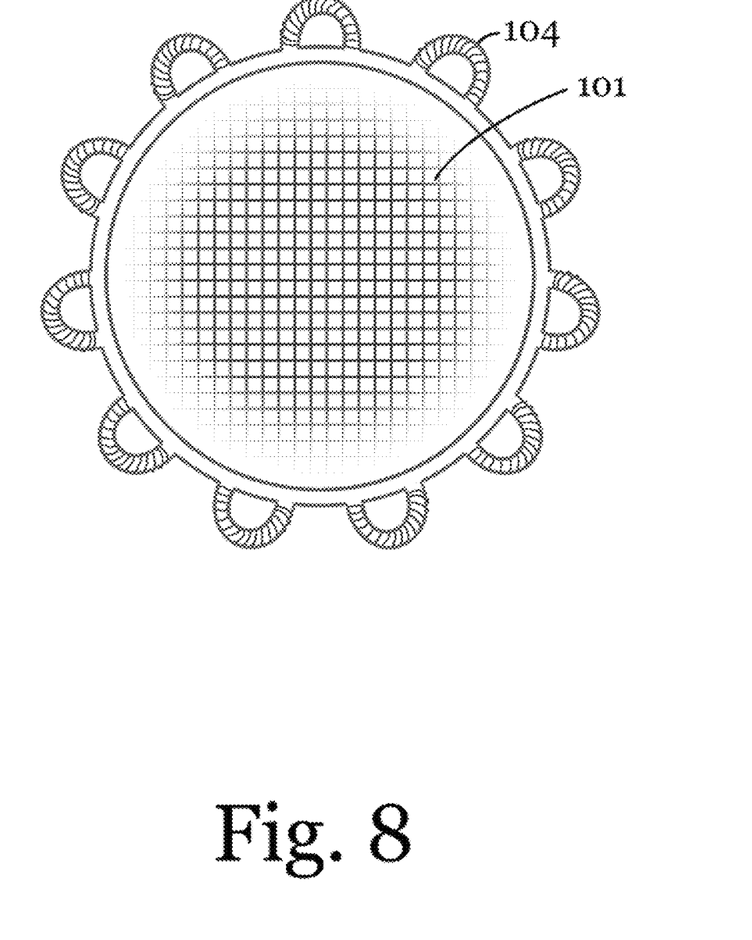
FIG. 8 is looking along the device geometric axis 100 of FIG. 7 showing one embodiment of an arrangement of helicity injectors 104. Not shown in this figure are the poloidal cusp field coils 102.

In another embodiment of the present invention helicity is impost on a magnetic mirror machine plasma. In FIG. 6 is shown a simple magnetic mirror machine. Adding helicity injectors 104 to the magnetic mirror machine midline for injecting helicity into the magnetic mirror machine is shown in FIG. 7. In this case the plasma is tilt-unstable and will invert in orientation to the lower energy state, however, it can be easily recognized in FIG. 8 that the simply-connected geometry of the magnetic mirror machine can be converted into the simply-connected geometry of a multiple ring-cusp reactor having helicity by adding any number of cusped field coils between the mirror coils 106 and the cusp field coils 102 centered on the device axis 100. Continuing to add poloidal cusp field coils between mirror coils 106 and cusp field coils 103 the reactor architecture, by expanding the plasmoid 101 to a larger aspect ratio, reduces to the device of FIG. 1-3 with the helicity injectors at the outboard midplane as in [11]. In the case that the cusps create a magnetic mirror field this is a spindle cusp. Magnetic mirrors being the most MHD-unstable nearest the midplane this location is preferred for helicity injection.

To further address cusp losses we suggest to heat cusp sheath electrons.

As suggested by Levine [23], and as in practice, electron heating must be driven by an outside source. This will lower the reactor Q-factor (Q~power out/recirculated power). Levine proposed that the electron particle confinement time in the sheath can be made equal to the ion particle confinement time leading to a 60-fold improvement in Lawson criterion.

H. Berk and colleagues carried out a computational study showing that the doubling of ion energy confinement time that they found for a conventional magnetic mirror was not worth the reduction in Q-factor due to electron heating and turbulence [24], However, tandem mirror reactors benefit from hot, end-cells [25] due to elimination of turbulence and a positive ambipolar potent barrier resulting in an overall increase in Q-factor. In cusp systems these turbulence should not be prominent and thus cusps may also benefit from ECH. Berk found a maximum in ion energy confinement time with a modest amount of electron heating.

Electrons in conventional open field-line systems have access to the loss cone and so increasing their temperature increases the ambipolar potential thereby enhancing ion losses. On the other hand injecting plasma with helicity into the system may reduce electron access to the loss cone as compared to field-free plasma. Enhanced ion, energy confinement time due to a hot electron sheath may overall improve Lawson criterion. The possibility for having closed orbits due to helicity injection within the normally field-free plasma region was not a feature of prior cusp reactors and so electron heating would not have been advantageous. In the present system/device helicity injection may allow for additional ion energy confinement time by a hot sheath. Furthermore the poloidal electron cooling seen in closed flux conserver spheromak systems nay be reduced by microwave heating along the edge.

In one example form of reactor 50 startup and operation, a puff of plasma is introduced into the reaction volume 70 whereby helicity injectors 104 impart helicity to the plasma while microwaves heat the electrons. The plasma is then sustained by particle and helicity flux from the helicity injectors, ICRH, ECRH, neutral beam injection, or any other combination of means. In another, "wet wood burner" form, gas in the reactor volume is ionized by microwave heating at the expense of Q-factor upon which helicity injectors inject plasma having helicity, replacing the field-free plasma lost prior to helicity injector operation. In both cases the plasma once formed is sustained by ICRH and, steady-inductive helicity injection, plus ECRH whenever necessary and, if advantageous, is driven to flow.

It should be appreciated that the various details of the present invention may be changed without departing from the spirit and scope of the invention. Furthermore, the foregoing description is for illustration only, and not for the purpose of limitation.

The following references [1] through [25] that were identified in the above paragraphs are hereby specifically incorporated herein by reference. Also, U.S. Pat. No. 9,462,669 Prater is hereby specifically incorporated herein by reference.

[1] J. D. Lawson, "Some criteria for a power producing thermonuclear reactor," *Proc. Phys. Soc. Sect.* 13, vol. 70, no. 1, p. 6, 1957.

[2] J. Berkowitz, K. O. Friedrichs, H. Goertzel, H. Grad, J. Killeen, and E. Rubin, "Cusped Geometries," 1958.

[3] T. J. Dolan, "Magnetic electrostatic plasma confinement," *Plasma Phys. Control. Fusion*, vol. 36, no. 10, pp. 1539-1593, October 1994, doi: 10.1088/0741-3335/36/10/001.

[4] M. J. Greenwald, "Temperature measurements in the TORMAC 4-C plasma," 1978.

[5] P. M. Bellan, "Spheromaks. A practical application of magnetohydrodynarnic dynamos and plasma self-organization," 2000.

[6] E. J. Spence, K. Reuter, and C. B. Forest, "A SPHERICAL PLASMA DYNAMO EXPERIMENT," *Astrophys. J.*, vol. 700, no. 1, pp. 470-478, July 2009, doi: 10.1088/0004-637X/700/1/470.

[7] C. Collins et al., "Stirring Unmagnetized Plasma," *Phys. Rev. Lett.*, vol. 108, no. 11, p. 115001, March 2012, doi: 10.1103/PhysRevLett.108.115001.

[8] C. M. Cooper et al., "The Madison plasma dynamo experiment: A facility for studying laboratory plasma astrophysics," *Phys. Plasmas*, vol. 21, no. 1, p. 013505, January 2014, doi: 10.1063/1.4861609.

[9] J. E. Maggs, T. A. Carter, and R. J. Taylor, "Transition from Bohm to classical diffusion due to edge rotation of a cylindrical plasma," *Phys. Plasmas*, vol. 14, no. 5, p. 052507, May 2007, doi: 10.1063/1.2722302.

[10] R. A. Cairns, Ed., *Radiofrequency Heating of Plasmas*, 1 edition. Bristol, England; Philadelphia: CRC Press, 1991.

[11] D. A. Sutherland et al., "The dynomak: An advanced spheromak reactor concept with imposed-dynamo current drive and next-generation nuclear power technologies," *Fusion Eng. Des.*, vol. 89, no. 4, pp. 412-425, April 2014, doi: 10.1016/j.fusengdes.2014.03.072.

[12] G. H. Miley and U. S. E. R. and D. A. D. of T. Information, *Fusion energy conversion*. American Nuclear Society, 1976.

[13] T. R. Jarboe, "The spheromak confinement device," *Phys. Plasmas*, vol. 12, no. 5, p. 058103, May 2005, doi: 10.1063/1.1891729.

[14] U. Shumlak and T. R. Jarboe, "Stable high beta spheromak equilibria using concave flux conservers," *Phys. Plasmas*, vol. 7, no. 7, pp. 2959-2963, June 2000, doi: 10.1063/1.874147.

[15] M. Bellan Paul, Magnetic Helicity, Spheromaks, Solar Corona Loops, And Astrophysical Jets. World Scientific, 2018.

[16] A. B. Hassam and Y.-M. Huang, "Thermoelectric rotating torus for fusion," *Phys. Rev. Lett.*, vol. 91, no. 19, p. 195002, November 2003, doi: 10.1103/PhysRevLett.91.195002.

[17] M. A. Levine, A. H. Boozer, and W. B. Kunkel, "TORMAC," 1975.

[18] R. L. Miller, R. A. Krakowski, and C. G. Bathke, "Parametric study of the Tormac fusion reactor concept," Los Alamos Scientific Lab., NM (USA), LA-7935-MS, August 1979.

[19] T. Jarboe et al., "Imposed-dynamo current drive," *Nucl. Fusion*, vol. 52, no. 8, p. 083017, 2012.

[20] A. C. Hossack et al., "Plasma response to sustainment with imposed-dynamo current drive in HIT-SI and HIT-513," *Nucl. Fusion*, vol. 57, no, 7, p. 076026, May 2017, doi: 10.1088/1741-4326/aa6ec7.

[21] R. F. Ellis et al., "Steady supersonically rotating plasmas in the Maryland Centrifugal Experiment," *Phys. Plasmas*, vol. 12, no. 5, p. 055704, May 2005, doi: 10.1063/1.1896954.

[22] L. Spitzer, "The Stellarator Concept," *Phys. Fluids*, vol. 1, no. 4, pp. 253-264, July 1958, doi: 10.1063/1.1705883.

[23] M. A. Levine, "Use of a hot sheath Tormac for advance fuels," 1977.

[24] H. L. Berk, D. L. Correll, C. Gormezano, and IM. E. Rensink, "Plasma energy confinement in conventional mirrors with externally heated electrons," *Nucl. Fusion*, vol. 18, no. 10, pp. 1379-1388, October 1978, doi: 10.1088/0029-5515/18/10/007.

[25] T. K. Fowler, R. W. Moir, and T. C. Simonen, "A new simpler way to obtain high fusion power gain in tandem mirrors," *Nucl. Fusion*, vol. 57, no. 5, p. 056014, March 2017, doi: 10.1088/1741-4326/aa5e54.

What is claimed is:

1. A plasma confinement device comprising:
 a chamber having a device axis;
 a plasma internal to the chamber;
 a magnetic helicity injector disposed on the chamber and configured to inject magnetic helicity into the chamber to the internal plasma creating an internal magnetic plasmoid having magnetic helicity;
 a plurality of cusped magnetic fields surrounding the internal magnetic plasmoid in a spatially periodic manner;
 a plurality of electrodes disposed in the chamber in a spatially periodic manner biased to drive plasma fluid rotation by driving a plurality of currents across a plurality of cusped magnetic fields;
 at least one closed internal magnetic field line within the internal plasma; and
 a rotating magnetic plasmoid bounded by the plurality of cusped magnetic fields comprising a confinement volume.

2. The device of claim 1, wherein the confinement volume is topologically simply connected having a geometric central device axis.

3. The device of claim 2, wherein the confinement volume is cylindrical, spherical, prolate, oblate, or otherwise varies in radius along its axial length.

4. The device of claim 2, wherein the confinement volume is bow tie shaped.

5. The device of claim 2, wherein the plurality of cusped magnetic fields is arranged to generate the magnetic mirror effect along the device axis.

6. The device of claim 2, wherein the plasma fluid flow is helical, being a sum of toroidal and poloidal fluid flows.

7. The device of claim 2, wherein a magnetic helicity injector is unrectified, rectified with half-wave, full-wave, or an intermediate amount of rectification.

8. The device of claim 2, wherein an antenna is disposed at the chamber wall for heating or driving current in the rotating magnetic plasmoid by microwaves, radio-frequency waves, acoustic waves, or other frequency waves.

9. The device of claim 1, wherein the confinement volume is topologically doubly connected toroidal having both a geometric central device major axis and a minor axis.

10. The device of claim 9, wherein a plurality of poloidal magnetic field coils carrying toroidal currents generates a plurality of cusped poloidal magnetic fields.

11. The device of claim 9, wherein a plurality of toroidal magnetic field coils carrying poloidal currents generates a plurality of cusped toroidal magnetic fields.

12. The device of claim 9, wherein electrodes are disposed about the device minor axis to induce toroidal plasma fluid rotation about the device major axis.

13. The device of claim 9, wherein electrodes are disposed about the device major axis to induce poloidal plasma fluid rotation about the device minor axis.

14. The device of claim 9, wherein the torus aspect ratio is less than, greater than, or equal to 1.

15. A method for confining plasma comprising:
providing one of a topologically singly connected chamber having a device axis or a topologically doubly connected chamber having a major axis and a minor axis;
providing a plasma internal to the chamber;
providing a magnetic helicity injector disposed on the chamber and configured to inject magnetic helicity into the chamber to the internal plasma creating an internal plasmoid having magnetic helicity;
providing a plurality of cusped magnetic fields surrounding the internal plasmoid in a spatially periodic manner;
providing a plurality of electrodes disposed in the chamber in a spatially periodic manner biased to induce plasma fluid rotation by driving a plurality of currents across a plurality of cusped magnetic fields;
providing at least one closed internal magnetic field line within the plasma; and
providing a rotating plasmoid bounded by the plurality of cusped magnetic fields comprising a confinement volume.

16. The method of claim 15, wherein magnetic helicity is provided unrectified, with half-wave, full-wave, or an intermediate amount of rectification.

17. The method of claim 15, wherein currents driven across magnetic fields by electrode bias provides magnetic plasmoid rotation about a device axis, minor axis, or both.

18. The method of claim 15, wherein microwaves, radio-frequency waves, acoustic waves, or other frequency waves are provided to heat or drive current in the rotating magnetic plasmoid.

* * * * *